United States Patent
Nanda et al.

(10) Patent No.: US 8,634,438 B2
(45) Date of Patent: Jan. 21, 2014

(54) WIRELESS COMMUNICATION SYSTEMS WITH FEMTO NODES

(75) Inventors: Sanjiv Nanda, Ramona, CA (US); Mehmet Yavuz, San Diego, CA (US); J. Rodney Walton, Carlisle, MA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 12/625,061

(22) Filed: Nov. 24, 2009

(65) Prior Publication Data

US 2010/0135234 A1 Jun. 3, 2010

Related U.S. Application Data

(60) Provisional application No. 61/118,866, filed on Dec. 1, 2008.

(51) Int. Cl.
*H04W 4/00* (2009.01)
*H04B 7/216* (2006.01)
*H04B 3/10* (2006.01)
*H04J 3/14* (2006.01)

(52) U.S. Cl.
USPC ........... 370/500; 370/328; 370/329; 370/331; 370/335

(58) Field of Classification Search
None
See application file for complete search history.

(56) References Cited

U.S. PATENT DOCUMENTS

| | | | |
|---|---|---|---|
| 7,289,473 B1 | 10/2007 | Padovani et al. | |
| 7,391,753 B2 | 6/2008 | Tiedemann et al. | |
| 2003/0008663 A1 | 1/2003 | Stein et al. | |
| 2007/0121555 A1* | 5/2007 | Burgess | 370/335 |
| 2009/0097451 A1 | 4/2009 | Gogic | |
| 2010/0029278 A1* | 2/2010 | Fang et al. | 455/436 |

FOREIGN PATENT DOCUMENTS

| | | | |
|---|---|---|---|
| EP | 1983786 A1 | 10/2008 | |
| EP | 1983786 A1 * | 10/2008 | |
| EP | 1998484 A1 | 12/2008 | |
| EP | 2037608 A1 | 3/2009 | |
| JP | 2002186025 A | 6/2002 | |
| JP | 2007529947 A | 10/2007 | |
| WO | 2002104056 A1 | 12/2002 | |
| WO | 05088336 | 9/2005 | |
| WO | WO 2007043915 A1 | 4/2007 | |
| WO | WO 2007103062 A1 | 9/2007 | |
| WO | WO 2007108080 A1 | 9/2007 | |
| WO | WO 2007142119 A1 | 12/2007 | |

OTHER PUBLICATIONS

Auer G: "Analysis of Pilot-Symbol Aided Channel Estimation for OFDM Systems with Multiple Transmit Antennas," Communications, 2004 IEEE International Conference on Paris, France June 20-24, 2004, IEEE, vol. 6, pp. 3221-3225.
International Search Report and Written Opinion—PCT/US2009/066288.
International Search Authority—European Patent Office, May 7, 2010.
Taiwan Search Report—TW098141049—TIPO—Jan. 28, 2013.

* cited by examiner

*Primary Examiner* — Faruk Hamza
*Assistant Examiner* — Diane Lo

(57) ABSTRACT

Systems and methods for performing a handoff of an access terminal from a macro node to a femto node are disclosed. To direct handoff of the access terminal, an identity of the femto node is determined. A femto node provided may be identified by at least a difference between the offset of a first pilot signal and the offset of a second pilot signal.

28 Claims, 9 Drawing Sheets

| Femto Node | Pilot 1 | Pilot 2 | Difference |
|---|---|---|---|
| Femto0 | A | B | 64 |
| Femto1 | A | C | 128 |
| Femto2 | A | D | 192 |
| Femto3 | B | C | 64 |
| Femto4 | B | D | 128 |
| Femto5 | C | D | 64 |
| Femto6 | A | B | 66 |
| Femto7 | A | C | 130 |
| Femto8 | A | D | 194 |
| Femto9 | B | C | 66 |
| Femto10 | B | D | 130 |
| Femto11 | C | D | 66 |
| Femto12 | A | B | 62 |
| Femto13 | A | C | 126 |
| Femto14 | A | D | 190 |
| Femto15 | B | C | 62 |
| Femto16 | B | D | 126 |
| Femto17 | C | D | 62 |
| Femto18 | A | B | 68 |
| Femto19 | A | C | 132 |
| Femto20 | A | D | 196 |
| Femto21 | B | C | 68 |
| Femto22 | B | D | 132 |
| Femto23 | C | D | 68 |
| Femto24 | A | B | 60 |
| Femto25 | A | C | 124 |
| Femto26 | A | D | 188 |
| Femto27 | B | C | 60 |
| Femto28 | B | D | 124 |
| Femto29 | C | D | 60 |

FIG. 8

WIRELESS COMMUNICATION SYSTEMS WITH FEMTO NODES

CLAIM OF PRIORITY UNDER 35 U.S.C. §119

The present application for patent claims priority to U.S. Provisional Application No. 61/118,866, entitled "FEMTO CELL HAND-IN METHODS AND SYSTEMS FOR LEGACY MOBILE TERMINALS WITH MULTIPLE PILOT TRANSMISSION FROM FEMTO CELLS," filed Dec. 1, 2008. The above-referenced application is hereby expressly incorporated by reference herein.

BACKGROUND

1. Field

The present application relates generally to wireless communication, and more specifically to systems and methods for using multiple pilot signals to uniquely identify a wireless communication device.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto nodes. Typically, such miniature base stations are connected to the Internet and the mobile operator's network via a DSL router or a cable modem. Multiple femto nodes may be deployed by individual users in the coverage area of a traditional macro node. Adjusting the method in which femto nodes identify themselves to accommodate for the greater number of femto nodes in a given area may be desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include identifying a plurality of nodes using limited resources.

One embodiment of the disclosure provides a wireless communication apparatus operative in a communication network. The apparatus comprises a receiver configured to receive at least one message indicative of a plurality of different pilot signals from a communication device. A first pilot signal comprises a first offset applied to a code. A second pilot signal comprises a second offset applied to the code. At least a difference between the first offset and the second offset acts as an identifier of the communication device. The apparatus further comprises a transmitter configured to transmit an instruction to another communication device. The instruction instructs the other communication device to communicate with the communication device. The transmitter transmits the instruction in response to the received at least one message.

Another embodiment of the disclosure provides a wireless communication apparatus operative in a communication network. The apparatus comprises a transmitter configured to transmit a plurality of different pilot signals. A first pilot signal comprises a first offset applied to a code. A second pilot signal comprises a second offset applied to the code. At least a difference between the first offset and the second offset acts as an identifier of the wireless communication apparatus. The apparatus further comprises a processor coupled to the transmitter, the processor being configured to direct the transmitter to transmit the plurality of different pilot signals.

Yet another embodiment of the disclosure provides a method for communicating in a communication network. The method comprises receiving at least one message indicative of a plurality of different pilot signals from a communication device. A first pilot signal comprises a first offset applied to a code. A second pilot signal comprises a second offset applied to the code. At least a difference between the first offset and the second offset acts as an identifier of the communication device. The method further comprises transmitting an instruction to another communication device. The instruction instructs the other communication device to communicate with the communication device. The instruction is transmitted in response to the received at least one message.

A further embodiment of the disclosure provides a method for communicating in a communication network. The method comprises transmitting a plurality of different pilot signals. A first pilot signal comprises a first offset applied to a code. A second pilot signal comprises a second offset applied to the code. At least a difference between the first offset and the second offset acts as an identifier of the wireless communication apparatus. The method further comprises directing the transmission of the plurality of different pilot signals.

Yet a further embodiment of the disclosure provides a wireless communication apparatus operative in a communication network. The apparatus comprises means for receiving at least one message indicative of a plurality of different pilot signals from a communication device. A first pilot signal comprises a first offset applied to a code. A second pilot signal comprises a second offset applied to the code. At least a difference between the first offset and the second offset acts as an identifier of the communication device. The apparatus further comprises means for transmitting an instruction to another communication device. The instruction instructs the other communication device to communicate with the communication device. The transmitting means transmits the instruction in response to the received at least one message.

Another embodiment of the disclosure provides a wireless communication apparatus operative in a communication network. The apparatus comprises means for transmitting a plurality of different pilot signals. A first pilot signal comprises a first offset applied to a code. A second pilot signal comprises a second offset applied to the code. At least a difference between the first offset and the second offset acts as an identifier of the wireless communication apparatus. The apparatus further comprises means for directing the transmitter to transmit the plurality of different pilot signals.

Yet another embodiment of the disclosure provides a computer program product, comprising computer-readable medium. The computer-readable medium comprises code for causing a computer to receive at least one message indicative of a plurality of different pilot signals from a communication device. A first pilot signal comprises a first offset applied to a code. A second pilot signal comprises a second offset applied to the code. At least a difference between the first offset and the second offset acts as an identifier of the communication device. The computer-readable medium further comprises code for causing a computer to transmit an instruction to another communication device. The instruction instructs the other communication device to communicate with the communication device. The instruction is transmitted in response to the received at least one message.

A further embodiment of the disclosure provides a computer program product, comprising computer-readable medium. The computer-readable medium comprises code for causing a computer to transmit a plurality of different pilot signals. A first pilot signal comprises a first offset applied to a code. A second pilot signal comprises a second offset applied to the code. At least a difference between the first offset and the second offset acts as an identifier of the wireless communication apparatus. The computer-readable medium further comprises code for causing a computer to direct the transmission of the plurality of different pilot signals.

BRIEF DESCRIPTION OF THE DRAWINGS

FIG. 8 is a table illustrating a first exemplary association of femto nodes and pilot signals which may be used by exemplary femto nodes and an exemplary macro node shown in FIGS. 4, 5, and 7.

DETAILED DESCRIPTION

Figure 1:
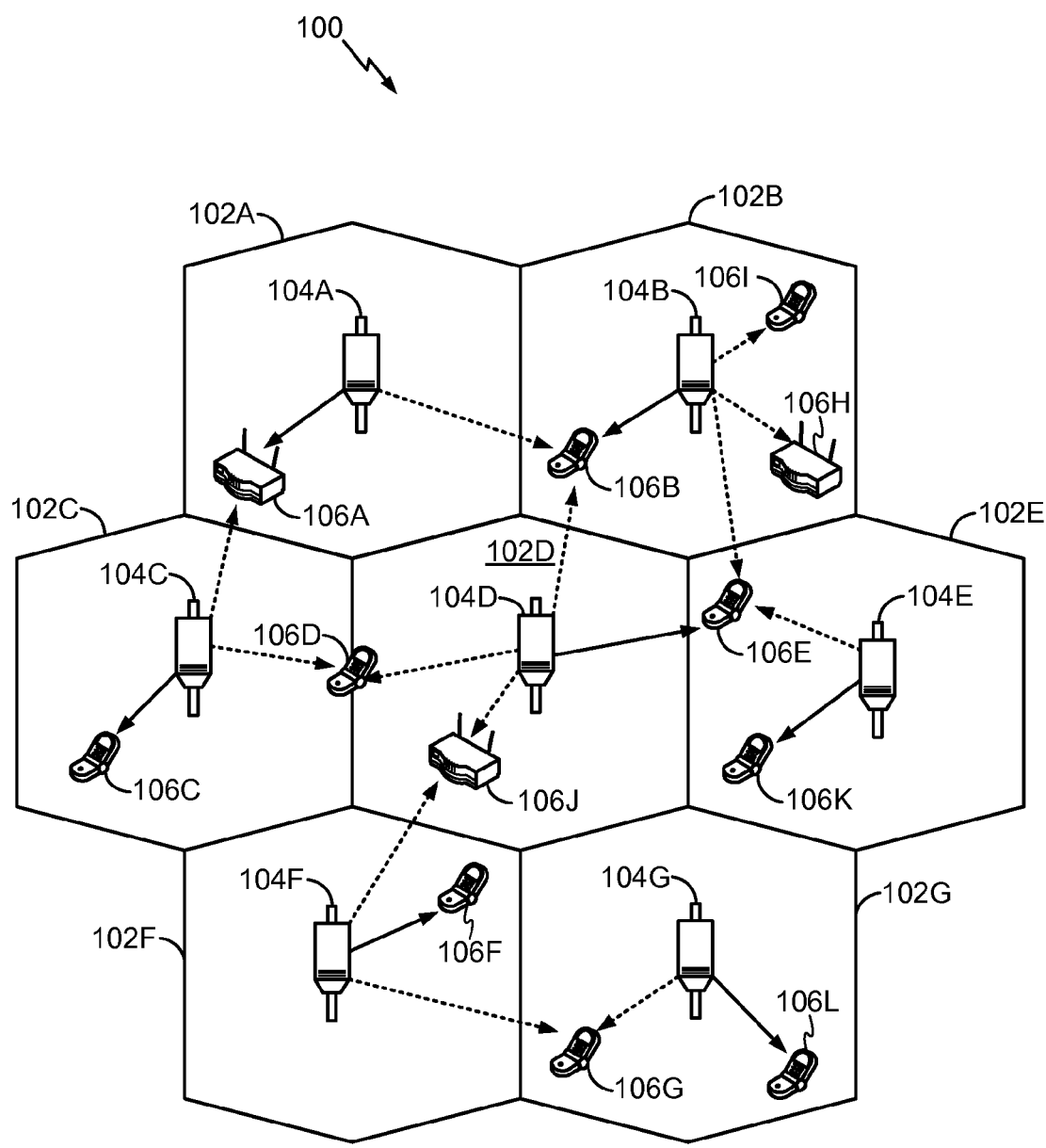
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The nodes 104 may be interconnected, for example, by appropriate wired or wireless interfaces and may be able to communicate with each other. Accordingly, each AT 106 may communicate with another AT 106 through one or more nodes 104. For example, the AT 106*j* may communicate with the AT 106*h* as follows. The AT 106*j* may communicate with the node 104*d*. The node 104*d* may then communicate with the node 104*b*. The node 104*b* may then communicate with the AT 106*h*. Accordingly, a communication is established between the AT 106*j* and the AT 106*h*.

The wireless communication network 100 may provide service over a large geographic region. For example, the cells 102*a*-102*g* may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106*a*, 106*h*, and 106*j* comprise routers. ATs 106*b*-106*g*, 106*i*, 106*k*, and 106*l* comprise mobile phones. However, each of ATs 106*a*-106*l* may comprise any suitable communication device.

Figure 2:
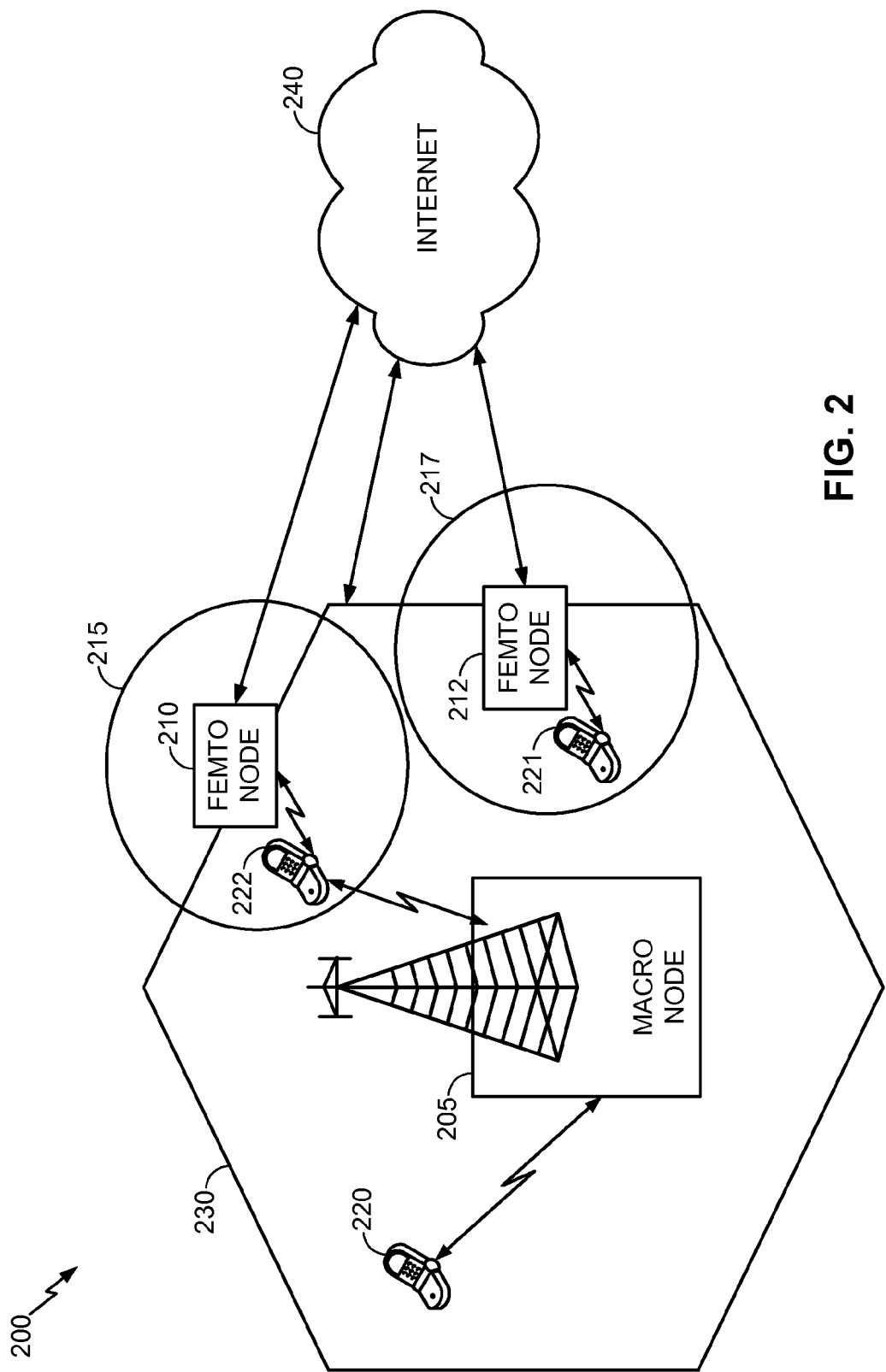
FIG. 2 illustrates exemplary interoperations of two or more communication networks.

FIG. 2 illustrates exemplary interoperations of two or more communication networks. It may desirable for an AT 220 to transmit information to and receive information from another AT such as AT 221. FIG. 2 illustrates a manner in which the ATs 220, 221, and 222 may communicate with each other. As shown in FIG. 2, the macro node 205 may provide communication coverage to access terminals within a macro area 230. For example, the AT 220 may generate and transmit a message to the macro node 205. The message may comprise information related to various types of communication (e.g., voice, data, multimedia services, etc.). The AT 220 may communicate with the macro node 205 via a wireless link. The macro node 205 may communicate with a network 240 via a wired link or via a wireless link. The femto nodes 210 and 212 may also communicate with the network 240 via a wired link or via a wireless link. The AT 222 may communicate with the femto node 210 via a wireless link and the AT 221 may communicate with the femto node 212 via a wireless link.

The macro node 205 may also communicate with devices such as servers (not shown in FIG. 2) and switching centers (not shown in FIG. 2) through the network 240. For example, the macro node 205 may transmit the message received from the AT 220 to a switching center (not shown in FIG. 2), which may forward the message to another network. The network 240 may also be used to facilitate communication between the ATs 220, 221, and 222. For example, the AT 220 may be in communication with the AT 221. The AT 220 may transmit a message to the macro node 205. The macro node 205 may forward the message to the network 240. The network 240 may forward the messages to the femto node 212. The femto node 212 may forward the message to the AT 221. Similarly, the reverse path may be followed from the AT 221 to the AT 220. In another example, the AT 221 may be in communication with the AT 222. The AT 221 may transmit a message to the femto node 212. The femto node 212 may forward the message to the network 240. The network 240 may forward the message to the femto node 210. The femto node 210 may forward the message to the AT 222. Similarly, the reverse path may be followed from the AT 222 to the AT 221.

In one embodiment, the femto nodes 210, 212 may be deployed by individual consumers and placed in homes, apartment buildings, office buildings, and the like. The femto nodes 210, 212 may communicate with the ATs in a predetermined range (e.g., 100 m) of the femto nodes 210, 212 utilizing a predetermined cellular transmission band. In one embodiment, the femto nodes 210, 212 may communicate with the network 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link.

The network 240 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 240 includes network variations such as the public Internet, a private network within the Internet, a secure network within the Internet, a private network, a public network, a value-added network, an intranet, and the like. In certain embodiments, network 240 may also comprise a virtual private network (VPN).

Figure 3:
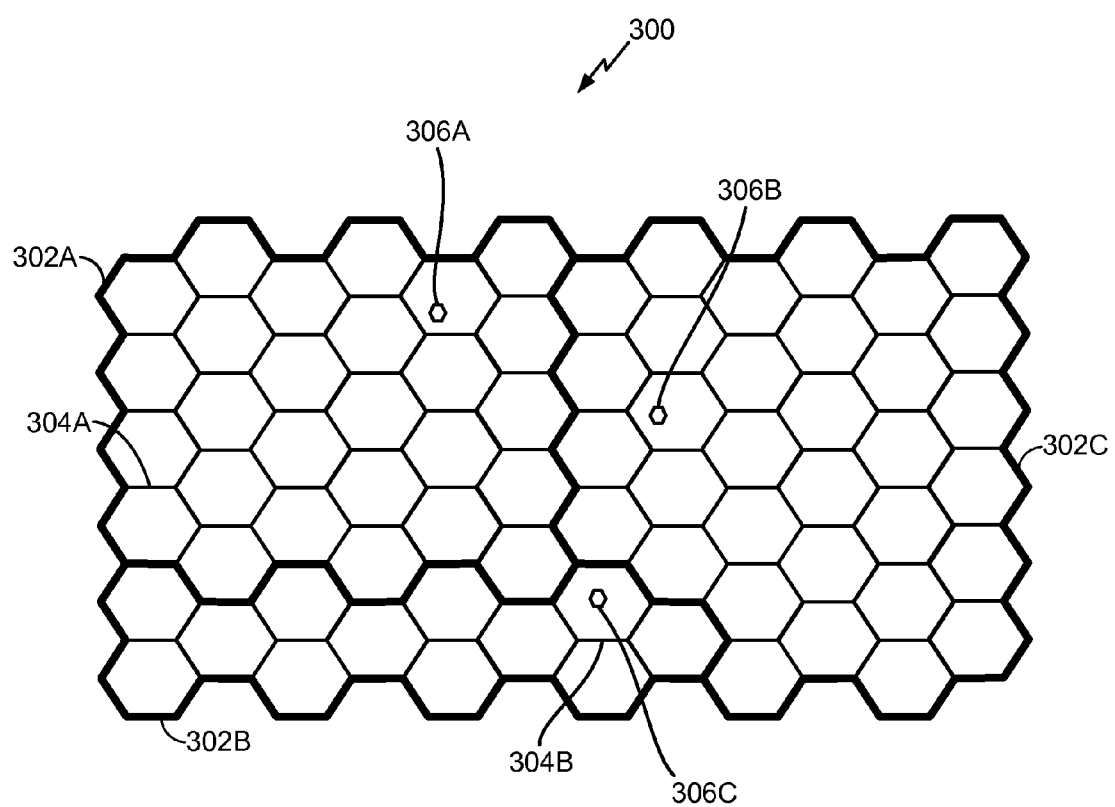
FIG. 3 illustrates exemplary coverage areas of the wireless communication networks shown in FIGS. 1 and 2.

FIG. 3 illustrates exemplary coverage areas of the wireless communication networks 100 and 200 shown in FIGS. 1 and 2. The coverage area 300 may comprise one or more geographical areas in which the AT 220 may access the communication network 240 as discussed above with respect to FIG. 2. As shown the coverage area 300 comprises several tracking areas 302 (or routing areas or location areas). Each tracking area 302 comprises several macro areas 304, which may be similar to the macro area 230 described above with respect to FIG. 2. Here, areas of coverage associated with tracking areas 302A, 302B, and 302C are shown as delineated by wide lines as and the macro areas 304 are represented by hexagons. The tracking areas 302 may also comprise femto areas 306, which may be similar to the femto area 230 described above with respect to FIG. 2. In this example, each of the femto areas 306 (e.g., femto area 306C) is depicted within a macro area 304 (e.g., macro area 304B). It should be appreciated, however, that a femto area 306 may not lie entirely within a macro area 304. In practice, a large number of femto areas 306 may be defined with a given tracking area 302 or macro area 304. Also, one or more pico areas (not shown) may be defined within a given tracking area 302 or macro area 304.

Referring again to FIG. 2, the owner of the femto node 210 may subscribe to a mobile service, such as, for example, 3G mobile service, offered through the communication network 240 (e.g., a mobile operator core network). In addition, an access terminal 221 may be capable of operating both in macro environments (e.g., macro areas) and in smaller scale (e.g., residential, femto areas, pico areas, etc.) network environments. In other words, depending on the current location of the access terminal 221, the access terminal 221 may access the communication network 240 by a macro node 205 or by any one of a set of femto nodes (e.g., femto nodes 210, 212). For example, when a subscriber is outside his home, he may be served by a macro node (e.g., node 205) and when the subscriber is at home, he may be served by a femto node (e.g., node 210). It should further be appreciated that the femto nodes 210 may be backward compatible with existing access terminals 221.

The femto node 210 may communicate over a single frequency or, in the alternative, over multiple frequencies. Depending on the particular configuration, the single frequency or one or more of the multiple frequencies may overlap with one or more frequencies used by a macro node (e.g., node 205).

In one embodiment, an access terminal 221 may be configured to connect to a particular (e.g., preferred) femto node (e.g., a home femto node of the access terminal 221) whenever the access terminal 221 is within communication range of the femto node. For example, the access terminal 221 may communicate with only the femto node 210 when the access terminal 221 is within the femto area 215.

In another embodiment, the access terminal 221 is communicating with a node but is not communicating with a preferred node (e.g., as defined in a preferred roaming list). In this embodiment, the access terminal 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The access terminal 221 may limit the BSR to scanning over one or more specific bands and/or channels. Upon discovery of a preferred femto node 210, the access terminal 221 selects the femto node 210 for communicating with to access the communication network 240 within the femto area 215.

For example, when the AT 221, which may be communicating with the macro node 205, gets close to the femto node 210, it may handoff (i.e., idle or active handoff) to the femto node 210. Accordingly, the AT 222 begins communicating with the femto node 210. In mobile networks such as 1xRTT, 1xEV-DO, WCDMA, HSPA, etc., when an access terminal gets close to a node, there are mechanisms to trigger the handoff. For example, each node (e.g., femto node, macro node, etc.) may be configured to generate and transmit a beacon. The beacon may comprise pilot channels and other overhead channels. Further, the beacon may be transmitted on multiple frequencies such that ATs operating on different frequencies can detect the beacon. The AT may use the beacon received from a node to identify the node for purposes of performing a handoff.

An access terminal (e.g., AT 220, 221, 222) may need to uniquely identify a femto node to determine whether or not to communicate with the femto node to access the communication network 240. For example, before the AT 221 can communicate with the femto node 210, it must be able to differentiate the femto node 210 from other nodes in the area. By identifying the femto node 210 uniquely, the AT 221 can appropriately direct communications to the femto node 210 and identify communications as originating from the femto node 210.

In one embodiment, an AT may uniquely identify a femto node by detecting a beacon comprising pilot signals transmitted from the femto node. The pilot signals may uniquely identify the femto nodes from which they were transmitted. For example, femto nodes 210 and 212 may each transmit a different pilot signal (e.g., pilot signal A and pilot signal B). The AT 221 may receive both pilot signals from each of the femto nodes 210 and 212. The AT 221 may then generate a pilot strength measurement report (PSMR). The PSMR may comprise the received pilot signals. The PSMR may further comprise the signal strength ($E_{cp}/I_o$) of the pilot signals. The AT 221 may transmit the PSMR in a pilot strength measurement message (PSMM) to the macro node 205 with which it is communicating.

The macro node 205 may access information (e.g., a database) that maps the pilot signal to the femto node. In one embodiment, the information mapping pilot signals to nodes may be stored at the macro node 205. In another embodiment, the macro node 205 may access a server on the network 240 which includes the information mapping pilot signals to nodes. In one embodiment, if the AT 221 is provisioned to communicate with the identified femto node, the macro node 205 may direct the AT 221 to handoff to the identified femto node. In another embodiment, the macro node 205 further determines if the signal strength of the pilot signal is above a threshold level before directing a handoff.

In one embodiment, each pilot signal comprises an offset pseudo noise (PN) short code. The offset PN short code may comprise a code or sequence of numbers (e.g., chips) that identifies the node and/or the node type (e.g., femto node, macro node, pico node). The offset PN short code may comprise a PN short code with a PN offset applied. The PN offset may indicate the delay from the true network synchronization time applied to a PN short code. In one embodiment, all of the nodes may use the same PN short code. However, a different PN offset may be applied to the PN short code for different nodes. Thus, the PN offset directly correlates to the offset PN short code and the terms "PN offset" and "offset PN short code" may be used interchangeably herein.

In one embodiment, the increment of delay between each PN offset is 64 chips. This ensures that received pilot signals are distinguishable. For example, when sending a pilot signal between the femto node 210 and the AT 221, there may be delay in the signal due to propagation delay over the communication path between the femto node 210 and the AT 221. Therefore a pilot signal with a PN offset of 64 sent by the femto node 210 may be delayed by 2 chips due to propagation delay and may be received as a PN offset of 66 by the AT 221. The AT 221 may search in a search window around the expected PN offset value to detect delayed pilot signals. For example, the AT 221 may have a search window of ±10 chips around the PN offset 64 to detect a delayed pilot signal. Since the offset of 66 is closer to the offset of 64 than any other pilot signal, it is safe to assume that the original pilot signal was sent with an offset of 64. Accordingly, by separating each pilot signal by at least 64 chips, small delays due to propagation delay do not affect detection of the pilot signal or identification of the transmitting node.

In one embodiment, the PN offset may be used to identify the type of node (e.g., femto node, macro node, pico node) transmitting signals. For example, a particular set of PN offsets may be reserved for identifying femto nodes. However, the number of PN offsets available for use may be smaller than the number of femto nodes within a geographic area. Thus the PN offset alone may not be sufficient to uniquely identify a femto node. For example, 6 unique PN offsets may be set aside for use by femto nodes. However, there may be more than 6 femto nodes deployed within the macro area 230. As a result, identifying each femto node using a single pilot signal with a given PN offset may not be sufficient to uniquely identify the femto node.

In one embodiment, each femto node may be identified by a plurality of pilot signals, each with a different given PN offset. For example, of the 5 reserved PN offsets for femto nodes, a combination of 2 pilot signals may be reserved for each femto node. Based on the 5 available PN offsets, there are 10 unique combinations. Accordingly, 10 femto nodes may be uniquely identified using only 5 PN offsets.

As discussed above in one embodiment, pilot signals may be separated by 64 chips to account for propagation delay. Propagation delay may be different for each communication path (e.g., the path between the AT 221 and the femto node 210 may have a different propagation delay than the path between the AT 221 and the femto node 212.). However, the propagation delay for each signal sent over a single communication path is substantially the same at any given time. For example, a pilot signal sent with offset 0 and a pilot signal sent with offset 64 may both be sent from the femto node 210 to the AT 221. Both pilot signals travel the same path and therefore, both pilot signals may experience the same propagation delay. For example, each pilot signal may be delayed by 2 chips. The offsets received at AT 221 may therefore be 2 and 66. Since the delay of each pilot signal sent over the same communication path is the same, the difference between the offsets of the pilot signals remains constant (e.g., 64−0=64 and 66−2=64). In one embodiment, this feature may be used to uniquely identify femto nodes.

In one embodiment, the difference between offsets of pilot signals transmitted by a femto node is used to uniquely identify the femto node. Accordingly, the PN offsets of the pilot signals transmitted may be sent with offsets that are separated by increments other than 64 chips. For example, the femto node 210 may be assigned pilot signals A and B. The offset of pilot signal A may be 0 and the offset of pilot signal B may be 64. Further, the femto node 210 may be assigned a pilot signal difference of 66. The femto node 212 may also be assigned pilot signals A and B. The femto node 212, however, may be assigned a pilot signal difference of 62. Accordingly, each of femto nodes 210 and 212 may send pilot signals within the search window of pilot signal A (e.g., offset 0±10 chips) and pilot signal B (e.g., offset 64±10 chips). However, femto node 210 may adjust the offset with which pilot signal A and/or pilot signal B is sent so that the difference between the pilot signals A and B is 66. For example, pilot signal A may be sent with offset 0 and pilot signal B may be sent with offset 66. Accordingly, the AT 221 may receive pilot signals A and B with a difference of 66 between them. In one embodiment, the AT 221 may send a PSMM reporting the pilot signals A and B and their respective PN offsets to the macro node 205. The macro node 205 may identify the femto node 210 as the transmitter of the pilot signals by the difference between the pilot signals alone. In another embodiment, the macro node 205 may identify the femto node 210 as the transmitter of the pilot signals by the difference between the pilot signals and based on the femto node 210 being assigned pilot signals A and B specifically.

Similarly, the femto node 212 may transmit pilot signal A with an offset of 0 and pilot signal B with an offset of 62. Accordingly, the AT 221 may receive the pilot signals and may send a PSMM reporting the pilot signals A and B and their respective PN offsets to the macro node 205. The macro node 205 may determine the identity of femto node 212 based on the difference of the received pilot signals. The macro node 205 may identify the femto node 212 even though the femto node 210 also transmitted pilot signals A and B, as the difference between the pilot signals still uniquely identifies each of the femto nodes 210 and 212. The macro node 205 may direct a handoff between the AT 221 and one of the femto nodes 210 and 212 as discussed above. For example, if the AT 221 is provisioned to communicate with the femto node 210 and the received strength of the pilot is greater than a threshold, the macro node 205 may direct the AT 221 to handoff and communicate with the femto node 210.

In one embodiment, a node may only provide certain services to certain access terminals with which it is provisioned to communicate. Such a node may be referred to as a "restricted" or "closed" node. In wireless communication networks comprising restricted femto nodes, a given access terminal may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of access terminals. This set may be temporarily or permanently changed to include additional or fewer access terminals as necessary. In some aspects, a Closed Subscriber Group ("CSG") may be defined as the set of access nodes (e.g., femto nodes) that share a common access control list of access terminals (e.g., a list of the restricted provisioned set of access terminals). A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 4:
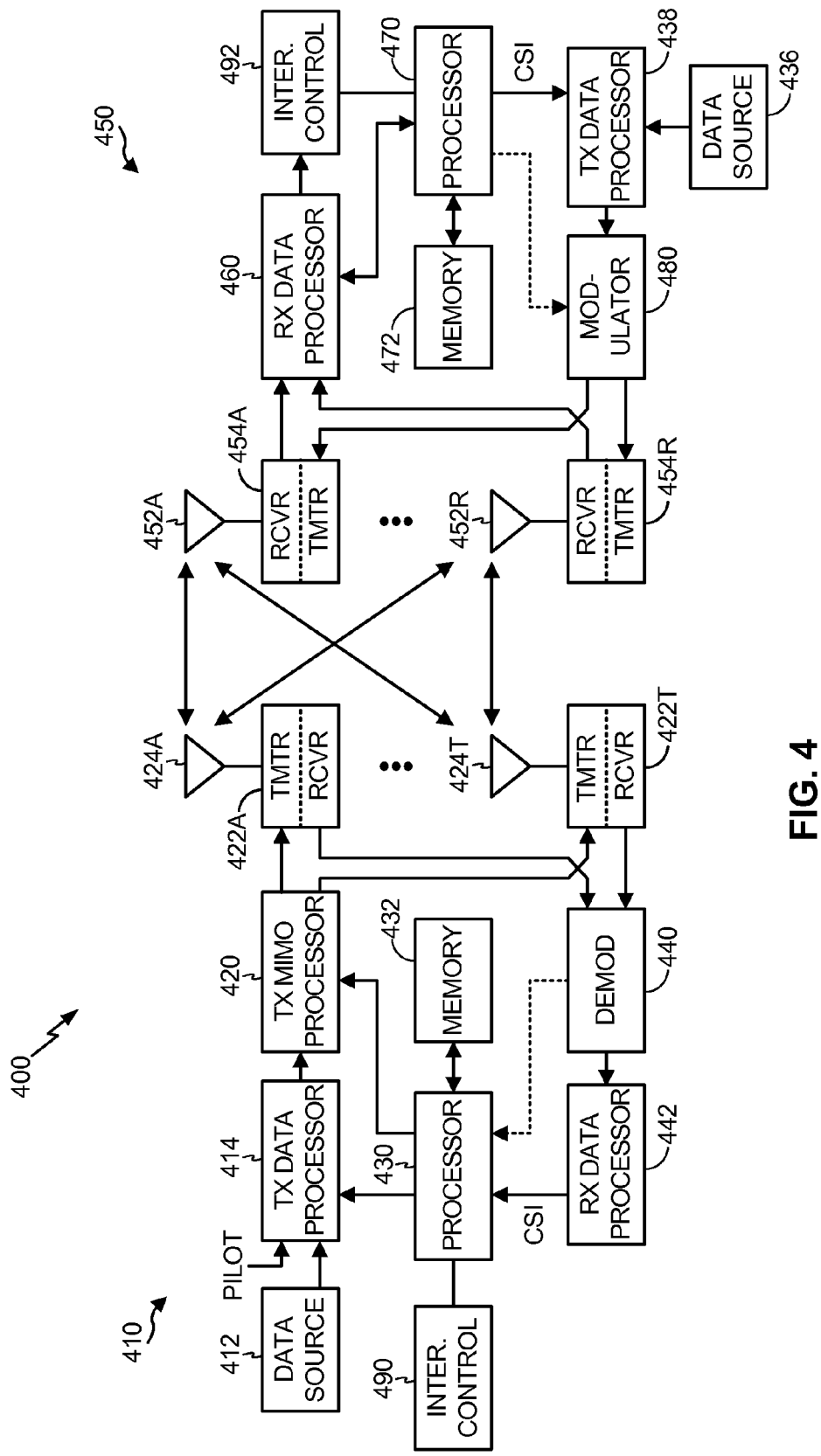
FIG. 4 is a functional block diagram of a first exemplary femto node and a first exemplary access terminal in one of the communication networks of FIG. 2.

FIG. 4 is a functional block diagram of a first exemplary femto node 410 and a first exemplary access terminal 450 in one of the communication networks of FIG. 2. As shown, a MIMO system 400 comprises a femto node 410 and an access terminal 450 (e.g., the AT 222). At the femto node 410, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, MPSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the femto node 410.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beam-forming weights to the symbols of the data streams and to the antenna from which the symbol is being transmitted.

Each transceiver 422 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the femto node 450, the transmitted modulated signals are received by NR antennas 452A through 452R and the received signal from each antenna 452 is provided to a respective transceiver ("XCVR") 454A through 454R. Each transceiver 454 conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454 based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the femto node 410.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the femto node 450.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmits the data streams back to the femto node 410.

At the femto node 410, the modulated signals from the femto node 450 are received by the antennas 424. Further, the transceivers 422 condition the modulated signals. A demodulator ("DEMOD") 440 demodulates the modulated signals. A RX data processor 442 processes the demodulated signals and extracts the reverse link message transmitted by the femto node 450. The processor 430 then determines which pre-coding matrix to use for determining the beam-forming weights. Further, the processor 430 processes the extracted message.

Further, the femto node 410 and/or the femto node 450 may comprise one or more components that perform interference control operations as taught herein. For example, an interference ("INTER") control component 490 may cooperate with the processor 430 and/or other components of the femto node 410 to send/receive signals to/from another device (e.g., femto node 450) as taught herein. Similarly, an interference control component 492 may cooperate with the processor 470 and/or other components of the femto node 450 to send/receive signals to/from another device (e.g., femto node 410). It should be appreciated that for each femto node 410 and 450 the functionality of two or more of the described components may be provided by a single component. For example, a single processing component may provide the functionality of the interference control component 490 and the processor 430. Further, a single processing component may provide the functionality of the interference control component 492 and the processor 470.

Figure 5:
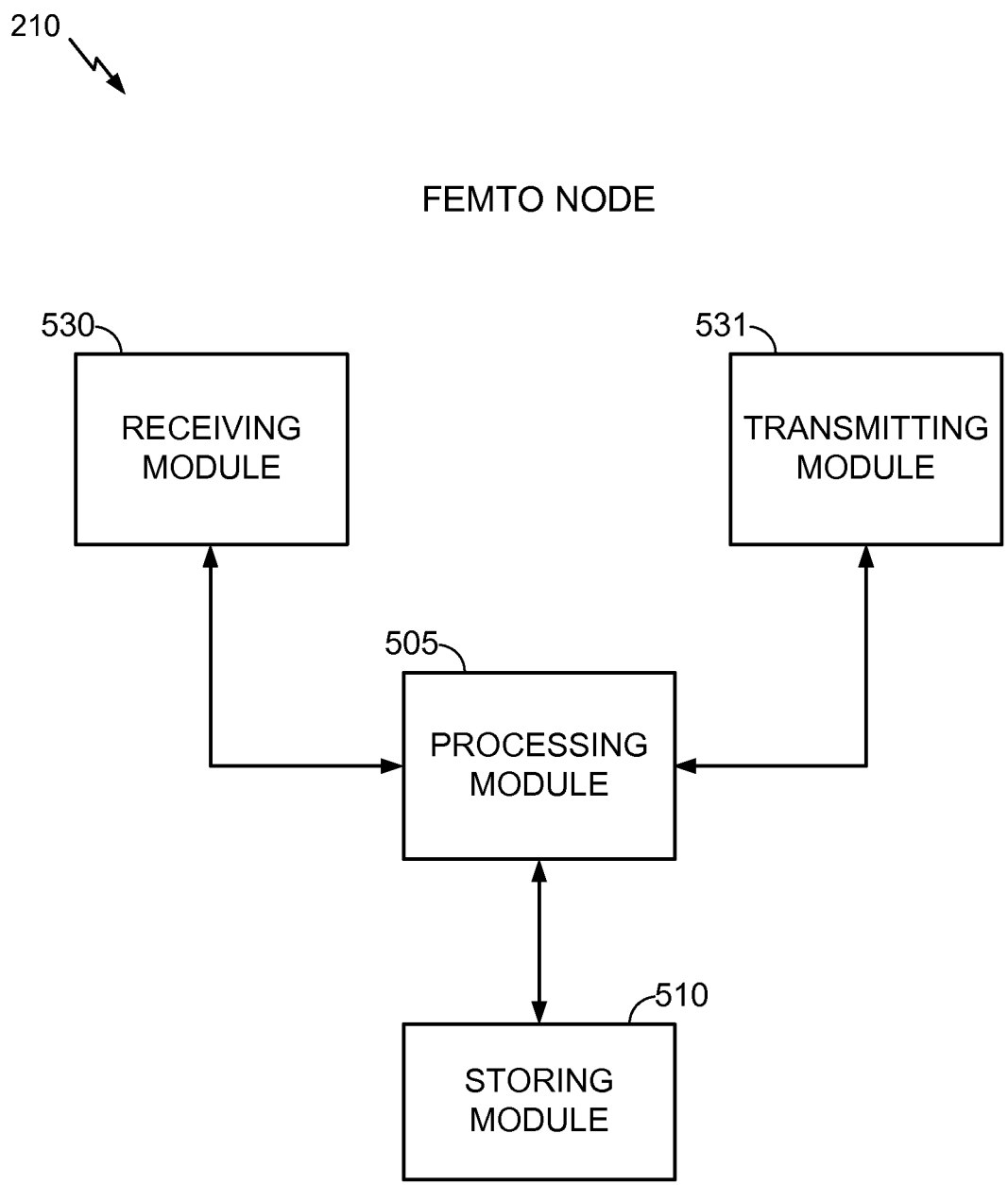
FIG. 5 is a functional block diagram of a second exemplary femto node in one of the communication networks of FIG. 2.

FIG. 5 is a functional block diagram of a second exemplary femto node 210 in one of the communication networks of FIG. 2. As discussed above with respect to FIG. 2, the femto node 210 may transmit one or more pilot signals. The femto node 210 may comprise a transmitting module 531. The transmitting module 531 may transmit the one or more pilot signals or other outbound messages to other devices. The femto node 210 may also comprise a receiving module 530 configured to receive inbound messages from devices such as the AT 221. The receiving module 530 and the transmitting module 531 may be coupled to the processing module 505. The receiving module 530 and the transmitting module 531 may also be configured to pass an outbound message to, and receive an inbound wired message from, the network 240. The receiving module 530 may pass the inbound wired message to the processing module 505 for processing. The processing module 505 may process and pass the wired outbound message to the transmitting module 531 for transmission to the network 240. The processing module 505 may be configured to process the inbound and outbound wireless messages coming from or going to the AT 221 via the receiving module 530 and the transmitting module 531. The processing module 505 may be further configured to generate the one or more pilot signals for transmission via the transmitting module 531. The processing module 505 may also be configured to control other components of the femto node 210.

The processing module 505 may further be coupled, via one or more buses, to a storing module 510. The processing module 505 may read information from or write information to the storing module 510. For example, the storing module 510 may be configured to store inbound our outbound messages before, during, or after processing. In particular, the storing module 510 may be configured to store information indicative of the pilot signal(s) assigned to the femto node 210.

The receiving module 530 and the transmitting module 531 may comprise an antenna and a transceiver. The transceiver may be configured to modulate/demodulate the wireless outbound/inbound messages going to or coming from AT 221 respectively. The wireless outbound/inbound messages may be transmitted/received via the antenna. The antenna may be configured to send and/or receive the outbound/inbound wireless messages to/from the AT 221 over one or more channels. The outbound/inbound messages may comprise voice and/or data-only information (collectively referred to herein as "data"). The receiving module 530 may demodulate the data received. The transmitting module 531 may modulate data to be sent from the femto node 210. The processing module 505 may provide data to be transmitted.

The receiving module 530 and the transmitting module 531 may further comprise a modem. The modem may be configured to modulate/demodulate the outbound/inbound wired messages going to or coming from the network 240. The receiving module 530 may demodulate data received. The demodulated data may be transmitted to the processing module 505. The transmitting module 531 may modulate data to be sent from the femto node 210. The processing module 505 may provide data to be transmitted.

The storing module 510 may comprise processing module cache, including a multi-level hierarchical cache in which different levels have different capacities and access speeds. The storing module 510 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the femto node 210 need not be separate structural elements. For example, the processing module 505 and the storing module 510 may be embodied in a single chip. The processing module 505 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the femto node 210, such as the processing module 505, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 210 may also be implemented as a combination of computing devices, e.g., a combination of a DSP and a microprocessor, a plurality of microprocessors, one or more microprocessors in conjunction with a DSP communication, or any other such configuration.

Figure 6:
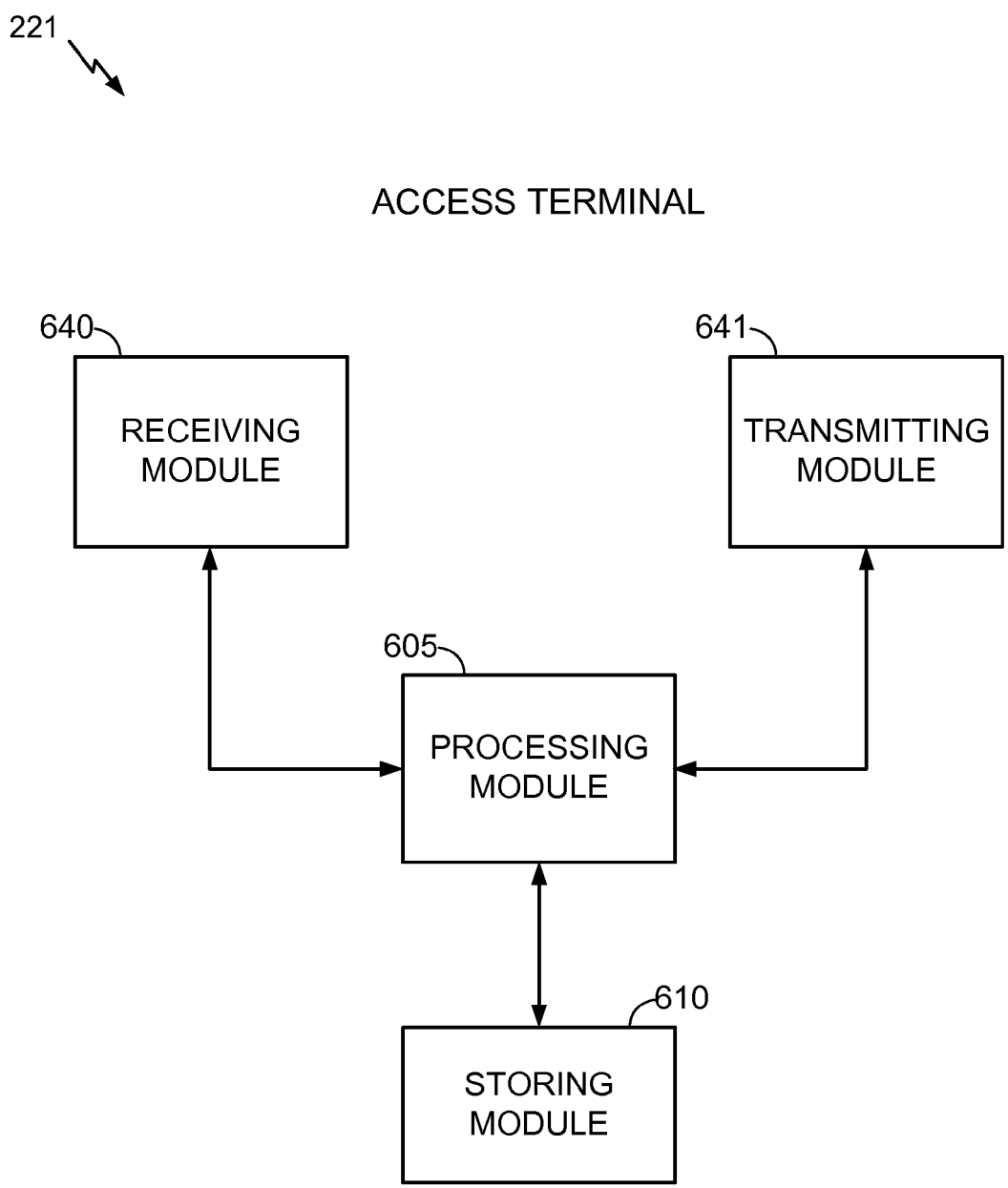
FIG. 6 is a functional block diagram of a second exemplary access terminal in one of the communication networks of FIG. 2.

FIG. 6 is a functional block diagram of a second exemplary access terminal 221 in one of the communication networks of FIG. 2. As discussed above, the AT 221 may be a mobile phone. The AT 221 may be used communicate information to and/or from the femto node 210 and/or the macro node 205.

The AT 221 may comprise a processing module 605 configured to process information for storage, transmission, and/or for the control of other components of the AT 221. The processing module 605 may further be coupled to a storing module 610. The processing module 605 may read information from or write information to the storing module 610. The storing module 610 may be configured to store information before, during or after processing. The processing module 605 may also be coupled to a receiving module 640 and a transmitting module 641. The receiving module 640 may be configured to receive an inbound wireless message from the femto node 210 (e.g., pilot signals) or the macro node 205. The transmitting module 641 may be configured to transmit an outbound wireless message to the femto node 210 or the macro node 205 (e.g., PSMMs).

The inbound wireless message may be passed to the processing module 605 for processing. For example, pilot signals received by the receiving module 640 may be passed to the processing module 605. The processing module 605 may generate a PSMM to report the pilot signals. The PSMM may comprise an indication of the offsets of the pilot signals. The PSMM may further comprise the received strength of the pilot signals. The processing module 605 may pass the PSMM to transmitting module 641 for transmission.

The receiving module 640 and the transmitting module 641 may comprise an antenna and a transceiver. The transceiver may be configured to modulate/demodulate the outbound/inbound wireless messages going to or coming from femto node 210 and the macro node 205. The outbound/inbound wireless messages may be transmitted/received via the antenna. The antenna may be configured to communicate with the femto node 210 and macro node 205 over one or more channels. The outbound/inbound wireless message may comprise voice and/or data-only information (collectively referred to herein as "data"). The receiving module 640 may demodulate the data received. The receiving module 640 may modulate data to be sent from the AT 221. The processing module 605 may provide data to be transmitted.

The storing module 610 may comprise processing module cache, including a multi-level hierarchical cache in which different levels have different capacities and access speeds. The storing module 610 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the access terminal 221 need not be separate structural elements. For example, the processing module 605 and the storing module 610 may be embodied in a single chip. The processing module 605 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the AT 221, such as the processing module 605 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the AT 221 may also be implemented as a combination of computing devices, e.g., a combination of a DSP and a microprocessor, a plurality of microprocessors, one or more microprocessors in conjunction with a DSP communication, or any other such configuration.

Figure 7:
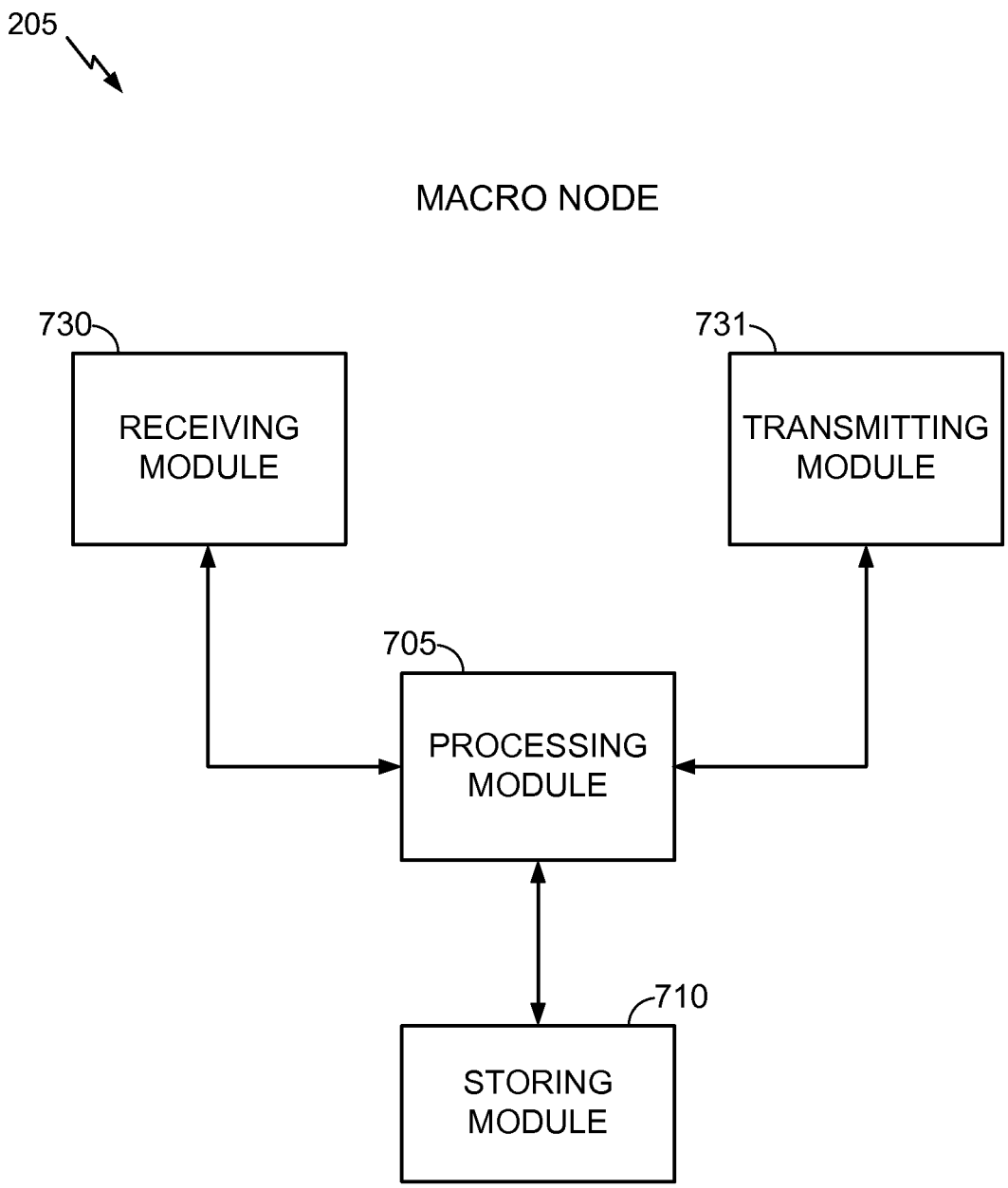
FIG. 7 is a functional block diagram of an exemplary macro node in one of the communication networks of FIG. 2.

FIG. 7 is a functional block diagram of an exemplary macro node 205 in one of the communication networks of FIG. 2. As discussed above with respect to FIG. 2, the macro node 205 may communicate with the AT 221 to provide the AT 221 with access to the network 240. The macro node 205 may comprise a receiving module 730 configured to receive inbound messages (e.g., PSMMs) from devices such as the AT 221. The macro node 205 may also comprise a transmitting module 731. The transmitting module 731 may transmit outbound messages (e.g., instruction to handoff) to other devices. The receiving module 730 and the transmitting module 731 may be coupled to the processing module 705. The receiving module 730 and the transmitting module 731 may also be configured to pass an outbound message to, and receive an inbound wired message from, the network 240. The receiving module 730 may pass the inbound wired message to the processing module 705 for processing. The processing module 705 may process and pass the wired outbound message to the transmitting module 731 for transmission to the network 240. The processing module 705 may be configured to process the inbound and outbound wireless messages coming from or going to the AT 221 via the receiving module 730 and the transmitting module 731. The processing module 705 may also be configured to control other components of the femto node 210.

The processing module 705 may further be coupled, via one or more buses, to a storing module 710. The processing module 705 may read information from or write information to the storing module 710. For example, the storing module 710 may be configured to store inbound our outbound messages before, during, or after processing. In particular, the storing module 710 may be configured to store information (e.g., a database, table, etc.) indicative of the pilot signal(s) and/or offset differences assigned to various femto nodes.

The processing module 705 may be further configured to process a PSMM received from an AT via the receiving module 730. For example, the macro node 205 may receive via the receiving module 730 a PSMM comprising one or more pilot signals sent by the AT 221. The processing module 705 may then access a data (e.g., a database) stored in the storing module 710 that indicates the pilot signal(s) and/or offset differences assigned to various femto nodes (e.g., the femto nodes in the macro area 230 which the macro node 205 serves). In another embodiment the processing module 705 may, via the receiving module 730 and the transmitting module 731, access such data on a server connected to the network 240.

The processing module 735 may further determine the identity of the femto node 210 that sent the pilot signals to the AT 221 based on the accessed data. The accessed data may further indicate whether the AT 221 is provisioned to communicate with the femto node 210. In one embodiment, the processing module 735 may further determine whether the strength of the pilot signals of the PSMM are above a threshold level. Based on the determined information, the processing module 735 may generate a message directing the AT 221 to handoff to the femto node 210 and begin communicating with the femto node 210. The processing module 735 may pass the message to the transmitting module 731, which sends the message to the AT 221.

The receiving module 730 and the transmitting module 731 may comprise an antenna and a transceiver. The transceiver may be configured to modulate/demodulate the wireless outbound/inbound messages going to or coming from AT 221 respectively. The wireless outbound/inbound messages may be transmitted/received via the antenna. The antenna may be configured to send and/or receive the outbound/inbound wireless messages to/from the AT 221 over one or more channels. The outbound/inbound messages may comprise voice and/or data-only information (collectively referred to herein as "data"). The receiving module 730 may demodulate the data received. The transmitting module 731 may modulate data to be sent from the macro node 205. The processing module 705 may provide data to be transmitted.

The receiving module 730 and the transmitting module 731 may further comprise a modem. The modem may be configured to modulate/demodulate the outbound/inbound wired messages going to or coming from the network 240. The receiving module 730 may demodulate data received. The demodulated data may be transmitted to the processing module 705. The transmitting module 731 may modulate data to be sent from the macro node 205. The processing module 705 may provide data to be transmitted.

The storing module 710 may comprise processing module cache, including a multi-level hierarchical cache in which different levels have different capacities and access speeds. The storing module 710 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the macro node 710 need not be separate structural elements. For example, the processing module 705 and the storing module 710 may be embodied in a single chip. The processing module 705 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the macro node 205, such as the processing module 705, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the macro node 205 may also be implemented as a combination of computing devices, e.g., a combination of a DSP and a microprocessor, a plurality of microprocessors, one or more microprocessors in conjunction with a DSP communication, or any other such configuration.

The functionality described herein (e.g., with regard to one or more of the accompanying figures) may correspond in some aspects to similarly designated "means for" functionality in the appended claims. Referring to FIGS. 5-7, the femto node 210, the AT 221, and the macro node 205 are represented as a series of interrelated functional modules.

The functionality of the modules of FIGS. 5-7 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

FIG. 8 is a table illustrating a first exemplary association of femto nodes and pilot signals which may be used by the femto nodes 210, 212 and macro node 205 shown in FIGS. 4, 5, and 7. As discussed above with FIGS. 2, 5, 6, and 7, the femto nodes in an area (e.g., macro area 230) may use a plurality of pilot signals and/or differences between the offsets of the pilot signals as a unique identifier. The pilot signals and differences may be assigned as shown in FIG. 8, with each femto node having a unique combination of pilots and a calculated difference between the offsets of the pilots. For example, table 800 comprises 4 unique pilot signals A, B, C, and D. These pilot signals may correspond to PN offsets of 0, 64, 128, and 192, respectively. Each femto node femto0-femto29 is assigned 2 of the pilot signals A, B, C, and D. Further, each femto node femto0-femto29 is assigned a difference between the PN offsets of the assigned pilot signals. As discussed above, a pilot signal received with a PN offset within the search window of one of the pilot signals A, B, C, and D, is interpreted as that pilot signal A, B, C, or D. Accordingly, each of the femto nodes femto0-femto29 transmits pilot signals, each with offsets within the search window of the assigned pilot signals. Further, the pilot signals are transmitted with the assigned difference between the PN offsets of the pilot signals. Accordingly, each of the femto0-femto29 transmits a unique "signature" or combination of pilot signals.

The table 800 may be stored at the macro node 205 or on a server coupled to the network 240. The server or the macro node 205 may therefore instruct each femto node as to the pilot signals it should transmit. Further, the pilot signals assigned to each femto node may remain constant or may be changed dynamically by the macro node 205 or the server.

The AT 221 may receive pilot signals from one or more femto nodes and report the pilot signals to the macro node 205 in a PSMM. The macro node 205 may have the table 800 or a data structure similar to table 800 stored in memory. In another embodiment, the table 800 or a similar data structure may be stored on the server connected to the network 240, which the macro node 205 accesses. The macro node 205 may determine an identity of the one or more femto nodes that transmitted the pilot signals to the AT 221 by matching the values of the one or more pilot signals to the values of the table 800. Accordingly, the macro node 205 can uniquely identify each femto node and direct the AT 221 to handoff to the identified femto node.

Figure 9:
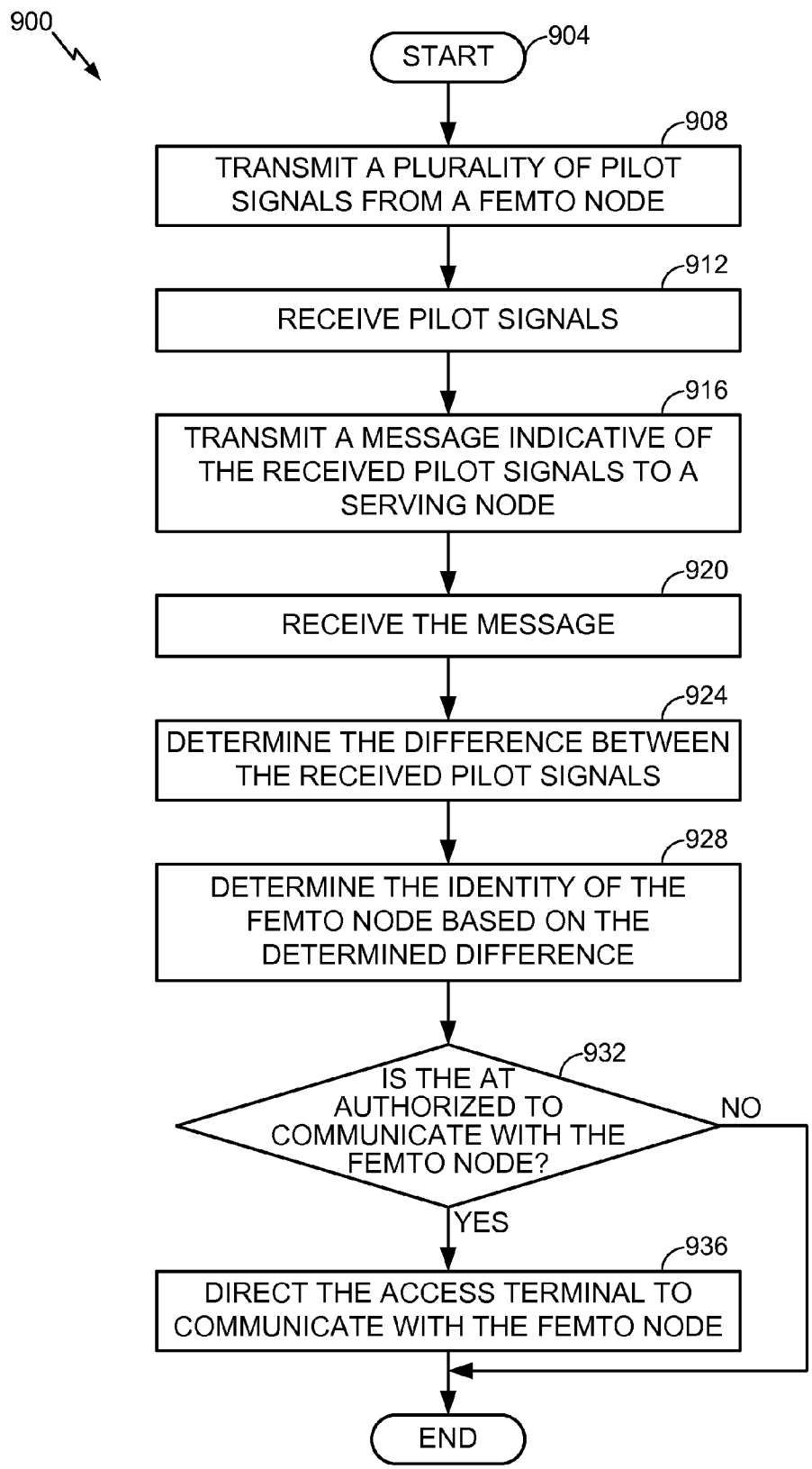
FIG. 9 is a flow chart illustrating an exemplary process for identifying a femto node shown in FIGS. 4 and 5.

FIG. 9 is a flow chart illustrating an exemplary process for identifying a femto node shown in FIGS. 4 and 5. At a first step 908, the femto node 210 transmits a plurality of pilot signals. Continuing at a step 912, the AT 221 receives the plurality of pilot signals. Further, at a step 916, the AT 221 transmits a message indicative of the received pilot signals to a serving node (e.g., the macro node 205) with which the AT 221 is communicating. Next, at a step 920, the serving node receives the message.

Continuing at a step 924, the serving node determines the difference between the PN offsets of the plurality of pilot signals. Further at a step 928, the serving node determines the identity of the femto node 210 based at least on the determined difference between the PN offsets of the plurality of pilot signals. For example, the serving node may access a table (e.g., table 800) that identifies the femto node 210 based on the determined difference between the PN offsets of the plurality of pilot signals and the individual PN offsets of the plurality of pilot signals.

At a next step 932, the serving node determines if the AT 221 is authorized to communicate with the femto node 210. For example, the serving node determines if the AT 221 is provisioned to communicate with the femto node 210. If the serving node determines that the AT 221 is not provisioned to communicate with the femto node 210, the process 900 ends. If the serving node determines that the AT 221 is provisioned to communicate with the femto node 210, the process 900 continues to a step 936. At the step 936, the serving node directs the AT 221 to hand off to and to communicate with the femto node 221. The process 900 then ends.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored as one or more instructions or code on a computer-readable medium. Computer-readable media includes computer storage media that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Further, if implemented in software, the functions may be transmitted as one or more instructions or code over a transmission medium. A transmission medium may be any available connection for transmitting the one or more instructions or code. For example, if the software is transmitted from a website, server, or other remote source using a coaxial cable, fiber optic cable, twisted pair, digital subscriber line (DSL), then the coaxial cable, fiber optic cable, twisted pair, DSL, are included in the definition of transmission medium.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless communication apparatus operative in a communication network, the apparatus comprising:
  a receiver configured to receive at least one message indicative of a plurality of different pilot signals from a communication device,
  wherein a first pilot signal received from the communication device comprises a first offset applied to a code, a second pilot signal received from the communication device comprises a second offset applied to the code, and
  wherein a combination of the first pilot signal received from the communication device, the second pilot signal received from the communication device, and a difference between the first offset of the first pilot signal and the second offset of the second pilot signal received from the communication device, acts as an identifier of the communication device; and
  a transmitter configured to transmit an instruction to another communication device, the instruction instructing the other communication device to communicate with the communication device, wherein the transmitter transmits the instruction in response to the received at least one message.

2. The apparatus of claim 1, wherein the code comprises a pseudo noise short code.

3. The apparatus of claim 2, wherein the pseudo noise short code comprises a code or sequence of numbers that identifies the communication device.

4. The apparatus of claim 1, further comprising a processor configured to assign the first pilot signal and the second pilot signal to the communication device.

5. The apparatus of claim 1, wherein the plurality of different pilot signals correspond to different pseudo noise short code offsets.

6. A wireless communication apparatus operative in a communication network, the apparatus comprising:
  a transmitter configured to transmit a plurality of different pilot signals from a communication device,
  wherein a first pilot signal transmitted from the communication device comprises a first offset applied to a code, a second pilot signal transmitted from the communication device comprises a second offset applied to the code, and
  wherein a combination of the first pilot signal transmitted from the communication device, the second pilot signal transmitted from the communication device, and a difference between the first offset of the first pilot signal and the second offset of the second pilot signal transmitted from the communication device, acts as an identifier of the communication device; and
  a processor coupled to the transmitter, the processor being configured to direct the transmitter to transmit the plurality of different pilot signals.

7. The apparatus of claim 6, wherein the code comprises a pseudo noise short code.

8. The apparatus of claim 6, wherein the transmitter is further configured to transmit the plurality of different pilot signals concurrently.

9. A method for communicating in a communication network, the method comprising:
- receiving at least one message indicative of a plurality of different pilot signals from a communication device,
- wherein a first pilot signal received from the communication device comprises a first offset applied to a code, a second pilot signal received from the communication device comprises a second offset applied to the code, and
- wherein a combination of the first pilot signal received from the communication device, the second pilot signal received from the communication device, and a difference between the first offset of the first pilot signal and the second offset of the second pilot signal received from the communication device, acts as an identifier of the communication device; and
- transmitting an instruction to another communication device, the instruction instructing the other communication device to communicate with the communication device, wherein the instruction is transmitted in response to the received at least one message.

10. The method of claim 9, wherein the code comprises a pseudo noise short code.

11. The method of claim 9, further comprising assigning the first pilot signal and the second pilot signal to the communication device.

12. A method for communicating in a communication network, the method comprising:
- transmitting a plurality of different pilot signals from a wireless communication apparatus,
- wherein a first pilot signal transmitted from the wireless communication apparatus comprises a first offset applied to a code, a second pilot signal transmitted from the wireless communication apparatus comprises a second offset applied to the code, and
- wherein a combination of the first pilot signal transmitted from the wireless communication apparatus, the second pilot signal transmitted from the wireless communication apparatus, and a difference between the first offset of the first pilot signal and the second offset of the second pilot signal transmitted from the wireless communication apparatus, acts as an identifier of the wireless communication apparatus; and
- directing the transmitting of the plurality of different pilot signals.

13. The method of claim 12, wherein the code comprises a pseudo noise short code.

14. The method of claim 12, further comprising transmitting the plurality of different pilot signals concurrently.

15. A wireless communication apparatus operative in a communication network, the apparatus comprising:
- means for receiving at least one message indicative of a plurality of different pilot signals from a communication device,
- wherein a first pilot signal received from the communication device comprises a first offset applied to a code, a second pilot signal received from the communication device comprises a second offset applied to the code, and
- wherein a combination of the first pilot signal received from the communication device, the second pilot signal received from the communication device, and a difference between the first offset of the first pilot signal and the second offset of the second pilot signal received from the communication device, acts as an identifier of the communication device; and
- means for transmitting an instruction to another communication device, the instruction instructing the other communication device to communicate with the communication device, wherein the means for transmitting transmits the instruction in response to the received at least one message.

16. The apparatus of claim 15, wherein the code comprises a pseudo noise short code.

17. The apparatus of claim 15, further comprising means for assigning the first pilot signal and the second pilot signal to the communication device.

18. A wireless communication apparatus operative in a communication network, the apparatus comprising:
- means for transmitting a plurality of different pilot signals from a communication device,
- wherein a first pilot signal transmitted from the communication device comprises a first offset applied to a code, a second pilot signal transmitted from the communication device comprises a second offset applied to the code, and
- wherein a combination of the first pilot signal transmitted from the communication device, the second pilot signal transmitted from the communication device, and a difference between the first offset of the first pilot signal and the second offset of the second pilot signal transmitted from the communication device, acts as an identifier of the communication device; and
- means for directing the means for transmitting to transmit the plurality of different pilot signals.

19. The apparatus of claim 18, wherein the code comprises a pseudo noise short code.

20. The apparatus of claim 18, wherein the means for transmitting is further configured to transmit the plurality of different pilot signals concurrently.

21. A computer program product comprising a non-transitory computer readable medium including program code stored thereon, the program code comprising:
- code for causing a computer to receive at least one message indicative of a plurality of different pilot signals from a communication device,
- wherein a first pilot signal received from the communication device comprises a first offset applied to a code, a second pilot signal received from the communication device comprises a second offset applied to the code, and
- wherein a combination of the first pilot signal received from the communication device, the second pilot signal received from the communication device, and a difference between the first offset of the first pilot signal and the second offset of the second pilot signal received from the communication device, acts as an identifier of the communication device; and
- code for causing the computer to transmit an instruction to another communication device, the instruction instructing the other communication device to communicate with the communication device, wherein the instruction is transmitted in response to the received at least one message.

22. The computer program product of claim 21, wherein the code comprises a pseudo noise short code.

23. The computer program product of claim 21, wherein the computer-readable medium further comprises code for causing the computer to assign the first pilot signal and the second pilot signal to the communication device.

24. A computer program product comprising a non-transitory computer readable medium including program code stored thereon, the program code comprising:
- code for causing a computer to transmit a plurality of different pilot signals from a wireless communication apparatus,
- wherein a first pilot signal transmitted from the wireless communication apparatus comprises a first offset applied to a code, a second pilot signal transmitted from the wireless communication apparatus comprises a second offset applied to the code, and wherein a combination of the first pilot signal transmitted from the wireless communication apparatus, the second pilot signal transmitted from the wireless communication apparatus, and a difference between the first offset of the first pilot signal and the second offset of the second pilot signal transmitted from the wireless communication apparatus, acts as an identifier of the wireless communication apparatus; and code for causing the computer to direct a transmission of the plurality of different pilot signals.

25. The computer program product of claim 24, wherein the code comprises a pseudo noise short code.

26. The computer program product of claim 24, wherein the computer-readable medium further comprises code for causing the computer to transmit the plurality of different pilot signals substantially concurrently.

27. At least one processor for communication comprising:
a first module, comprising hardware, for receiving at least one message indicative of a plurality of different pilot signals from a communication device, wherein a first pilot signal received from the communication device comprises a first offset applied to a code, a second pilot signal received from the communication device comprises a second offset applied to the code, and wherein a combination of the first pilot signal received from the communication device, the second pilot signal received from the communication device, and a difference between the first offset of the first pilot signal and the second offset of the second pilot signal received from the communication device, acts as an identifier of the communication device; and a second module for transmitting an instruction to another communication device, the instruction instructing the other communication device to communicate with the communication device, wherein the instruction is transmitted in response to the received at least one message.

28. At least one processor for communication comprising:
a first module, comprising hardware, for transmitting a plurality of different pilot signals from a wireless communication apparatus, wherein a first pilot signal transmitted from the wireless communication apparatus comprises a first offset applied to a code, a second pilot signal transmitted from the wireless communication apparatus comprises a second offset applied to the code, and wherein a combination of the first pilot signal transmitted from the wireless communication apparatus, the second pilot signal transmitted from the wireless communication apparatus, and a difference between the first offset of the first pilot signal and the second offset of the second pilot signal transmitted from the wireless communication apparatus, acts as an identifier of the wireless communication apparatus; and a second module for directing the transmitting of the plurality of different pilot signals.

* * * * *